April 30, 1940.                A. C. WINTERS, JR                2,198,898
                                  MILK CAN DRIER
                                Filed May 1, 1939              2 Sheets-Sheet 1
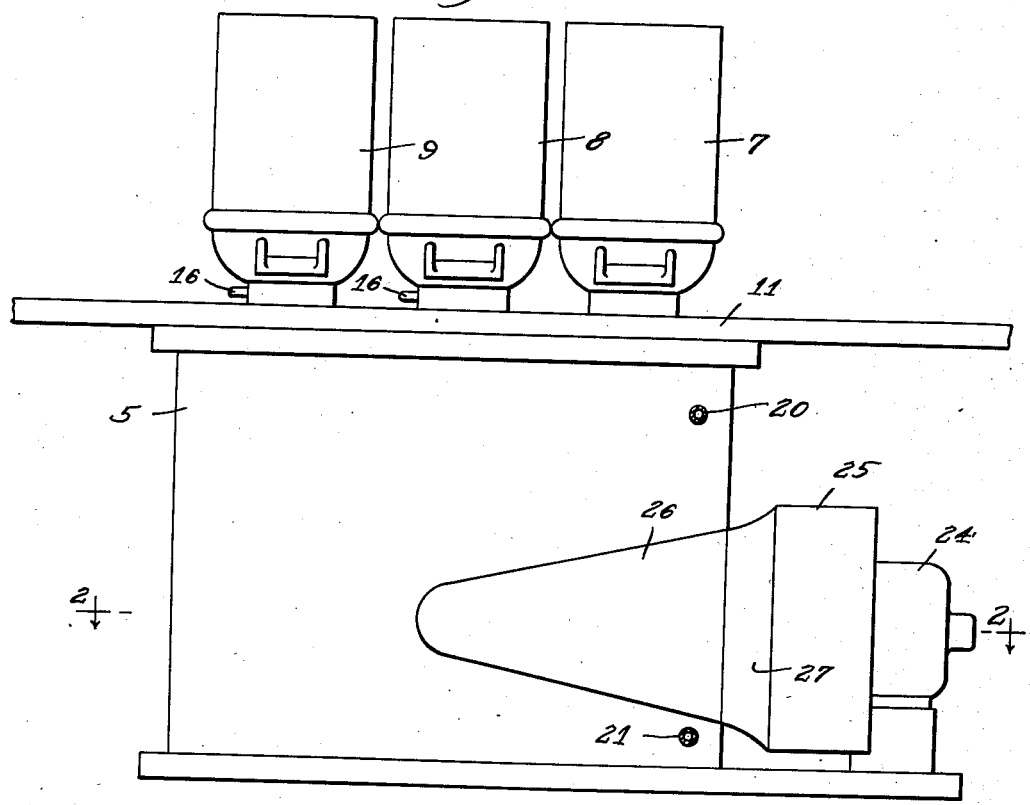
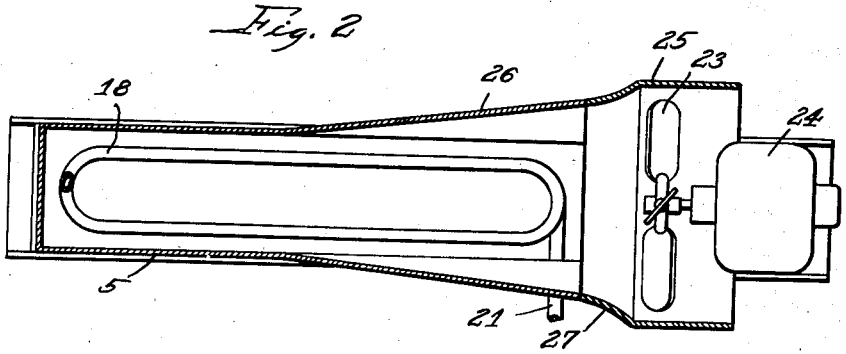

April 30, 1940. A. C. WINTERS, JR 2,198,898
MILK CAN DRIER
Filed May 1, 1939 2 Sheets-Sheet 2
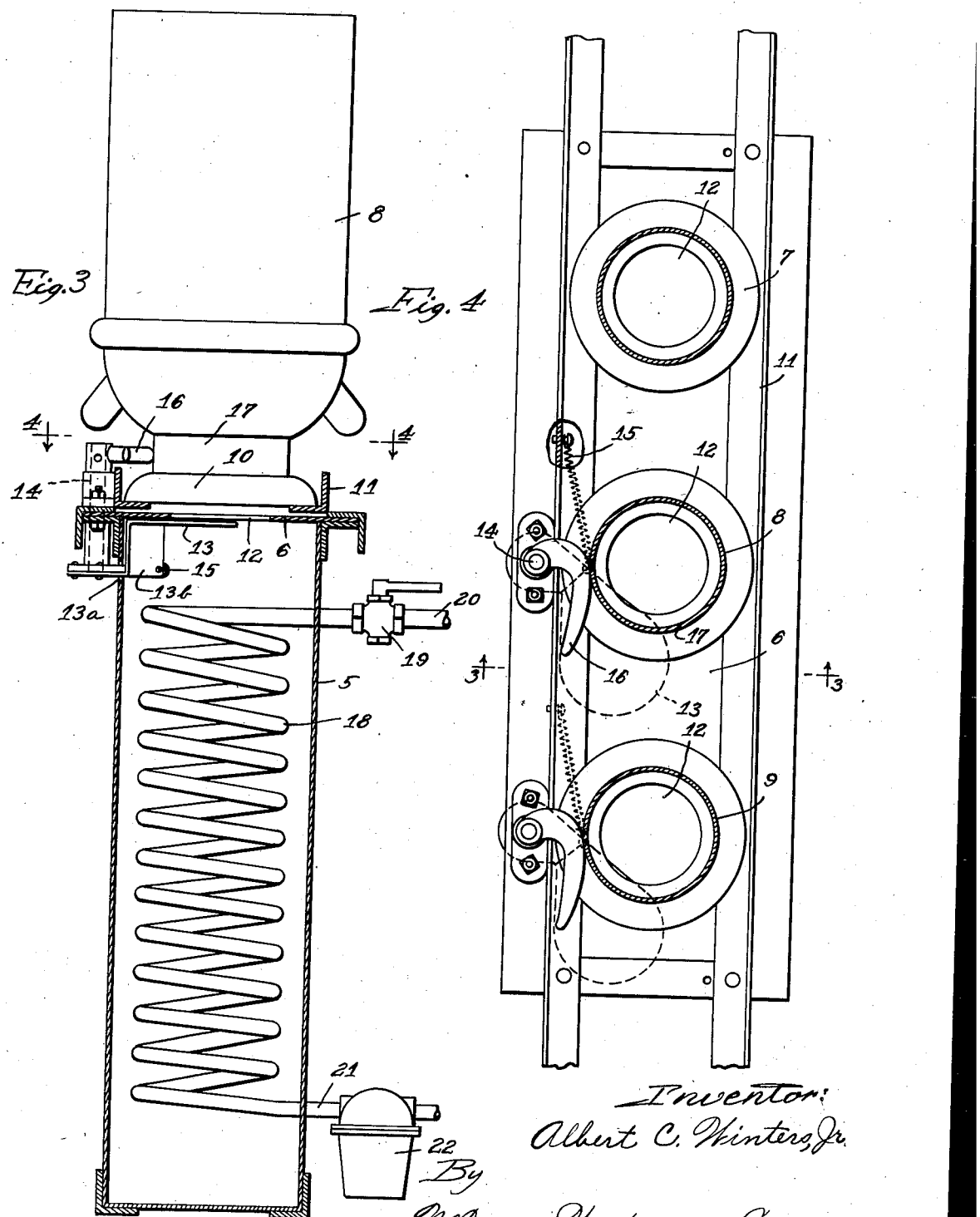

Patented Apr. 30, 1940

2,198,898

UNITED STATES PATENT OFFICE 2,198,898

MILK CAN DRIER

Albert C. Winters, Jr., Rockford, Ill.

Application May 1, 1939, Serial No. 271,059

4 Claims. (Cl. 34—26)

This invention relates to a new and improved milk can drier.

Small dairy plants have been seriously handicapped in the matter of properly cleaning and drying milk cans, because the smaller plants cannot afford expensive equipment, and heretofore the only equipment available has been designed for large plants. The small plant operator was, therefore, compelled to resort to makeshift methods of cleaning and drying, which besides being slow and tedious were in most cases objectionable also from the sanitation standpoint. It is therefore the principal object of my invention to provide a small, inexpensive, and thoroughly efficient milk can drier, especially designed and adapted for use in smaller dairy plants.

The device of my invention comprises a drier box of elongated form containing heating coils to heat the air circulated therethrough by means of a fan, and having on the top thereof longitudinally extending guides for supporting the cans in slightly raised relation to the top of the drier box to permit circulation of air through ports in the top of the box up into the cans and out again, the ports having spring operated shutters for automatically closing the same when the cans are removed so that there will be no waste of hot air, and the shutters being also operable automatically by fingers arranged to be engaged and moved by the cans as the cans come into position over the ports. The ports are so spaced that they register with the mouths of the cans standing upside down on the guides in contact with one another.

The invention is illustrated in the accompanying drawings, in which—

Fig. 1 is a side view of a milk can drier made in accordance with my invention, and showing three milk cans in the process of being dried.

Fig. 2 is a horizontal section on the line 2—2 of Fig. 1.

Fig. 3 is a vertical section through the drier taken on the line 3—3 of Fig. 4; and Fig. 4 is a horizontal section on the line 4—4 of Fig. 3.

The same reference numerals are applied to corresponding parts throughout the views.

The reference numeral 5 designates the drier box, which will be located conveniently in the dairy plant near the end of the can-washing tank, and which is preferably of elongated rectangular form, with the top 6 thereof about waist high so that the workman will find it convenient to place milk cans, like those shown at 7, 8, and 9, on top of the drier upside down, with the mouths 10 resting on the laterally spaced longitudinally extending angle iron guides 11. The guides 11, as clearly appears in Fig. 3, support the cans in slightly raised relation to the top 6 so as to permit free circulation of air from the drier box 5 up into the cans and out again. Ports 12 for the discharge of hot air are provided in the top wall 6 in longitudinally spaced relation and just far enough apart so that they will register with the open mouths of the cans standing in a row on top of the drier in contact with one another, as shown in Fig. 1. Three or more cans will be dried at a time, depending upon the size of the drier; the present drier will handle just three, there being only three ports 12. The operator places the first can over the first port 12 at the right hand end of the drier box 5, as seen in Fig. 1, and then places a second can on the guides 11 next to it, and pushes the first can along to the second port, and thereafter follows with a third can, pushing the other two along so as to cover all three ports. By that time the first can is dry and is removed from the third port, and then another can is placed on the guides 11 to advance the remaining two cans, and so on. In accordance with a novel feature of my invention, shutters 13 are provided in the drier box 5 to cover all but the first port 12. In other words, there are two of these shutters in the present three-port unit, and a four-port unit will have three shutters, and so on. Each of these shutters extends through an opening 13a provided in the side wall of the drier box 5 for connection with its associated pivot pin 14, and is normally held closed by a coiled tension spring 15, but is arranged to be opened against the action of the spring by means of a finger 16 attached to the pivot pin 14 and projecting over the top of the adjacent guide 11 into the path of movement of the cans so as to be engaged by the necks 17 of the cans and moved as the cans are slid along the guides. The shank portion 13b of each shutter has the spring 15 attached to it and serves by engagement with one end of the opening 13a to limit movement of the shutter 13 under action of the spring when the shutter reaches closed position. These shutters serve to cut off the discharge of hot air automatically when the cans are removed, and in that way there is no wasting of hot air and the efficiency of the drier is not lowered. The shutter for the third and last port is particularly important because this port remains uncovered for longer intervals than either of the other two, during the period when a dried can is removed and a wet can is being placed on the drier and the other cans are moved ahead by means of it. If this port were left open, it is obvious that the efficiency of the unit would be greatly impaired. The first port does not require any shutter, although one may be provided if desired. The reason no shutter is needed at that point is that there is a can over this port whenever the drier is in operation, and the port is not left uncovered except for the brief intervals during which the wet cans are moved into position over this port and the other cans are moved forward. The fingers 16 are curved so as to ride off the necks 17 of the cans before they have moved entirely out of register with the ports. In that way, each shutter has an opportunity to close for a brief interval before the next can comes into position and engages and moves the finger 16 associated therewith, thereby increasing the efficiency of the unit by cutting down the amount of hot air lost.

Any suitable or preferred means may be employed for heating the air and causing an induced draft through the drier box and out through the ports 12. Inasmuch as there is steam available in all dairy plants, I prefer to provide a steam heated coil 18 arranged to be connected through a shut-off valve 19 with a steam line 20, the steam entering the top of the coil and traveling downwardly toward the outlet connection 21, where the condensate escapes through a steam trap 22, which avoids the wasting of steam. The counter current principle is used, the incoming cold air being first brought into contact with the cooler turns of pipe and being caused to flow upwardly over the hotter turns, and finally outwardly through the ports 12, thereby making for the most efficient heat transfer to the air. A fan 23 driven by an electric motor 24 operates inside a hood 25, which opens into the drier box 5 near the bottom thereof and at one end. The opposite side walls of the box are preferably spread outwardly on a taper to meet the funnel end 27 of the hood 25 so as to permit introducing air at the desired velocity into the drier box. The air forced into the drier box by the fan is, of course, heated and dried by contact with the coil 18, and the air leaving the drier box is therefore in good condition for drying out the cans placed over the ports 12. The fact that the cans are upside down and are therefore in a position to drain any remaining water therefrom during the drying process is also important, and the dairyman is therefore assured that when the cans are dried on this drier they are not only clean but also dried thoroughly and are ready for filling.

It is believed the foregoing description conveys a good understanding of the objects and advantages of my invention. The appended claims have been drawn with a view to covering all legitimate modifications and adaptations.

I claim:

1. A milk can drier comprising an elongated drier box having air discharge openings provided in the top thereof in longitudinally spaced relation, the holes being so spaced in relation to one another to register with the mouths of milk cans standing upside down in a row over said openings and in contact with one another, guides for supporting the cans by their mouths in closely spaced relation to the top of the drier box, said guides permitting sliding movement of the cans together into register with and relative to said ports, air heating means in said box and means for forcing air through said box in contact with the heating means and out through said top openings.

2. A milk can drier comprising an elongated drier box having air discharge openings provided in the top thereof in longitudinally spaced relation, the holes being so spaced in relation to one another to register with the mouths of milk cans standing upside down in a row over said openings and in contact with one another, guides for supporting the cans by their mouths in closely spaced relation to the top of the drier box, said guides permitting sliding movement of the cans together into register with and relative to said ports, air heating means in said box, means for forcing air through said box in contact with the heating means and out through said top openings, shutters for closing one or more of said top openings, spring means normally tending to move said shutters in one direction to close the openings, and fingers operatively connected with the shutters and so arranged with respect to the guides to be engaged and moved by contact with the cans so as to open the shutters when the cans are in registration with said openings.

3. A milk can drier comprising an elongated drier box having air discharge openings provided in the top thereof in longitudinally spaced relation, the holes being so spaced in relation to one another to register with the mouths of milk cans standing upside down in a row over said openings and in contact with one another, guides for supporting the cans by their mouths in closely spaced relation to the top of the drier box, said guides permitting sliding movement of the cans together into register with and relative to said ports, a coil for heating air disposed in said drier box and comprising vertically spaced turns of pipe, means for supplying a fluid heating agent to said coil at the upper end thereof, a lower discharge connection for said coil, and a power operated fan for introducing air into said drier box near the bottom thereof and at one end for passage upwardly in contact first with the cooler turns and finally with the hottest turns of pipe in said heating coil before discharge through said top openings.

4. A milk can drier comprising an elongated drier box having air discharge openings provided in the top thereof in longitudinally spaced relation, the holes being so spaced in relation to one another to register with the mouths of milk cans standing upside down in a row over said openings and in contact with one another, guides for supporting the cans by their mouths in closely spaced relation to the top of the drier box, said guides permitting sliding movement of the cans together into register with and relative to said ports, air heating means in said box, means for forcing air through said box in contact with the heating means and out through said top openings, a shutter for closing the final one of the series of top openings, spring means normally tending to move said shutter in one direction to close the opening, and a finger operatively connected with the shutter and so arranged with respect to the guides to be engaged and moved by contact with the cans so as to open the shutter when the cans are in registration with said openings.

ALBERT C. WINTERS, Jr.